(12) United States Patent
Narla

(10) Patent No.: US 11,190,031 B2
(45) Date of Patent: Nov. 30, 2021

(54) ARC FAULT DETECTION FOR BATTERY PACKS IN ENERGY GENERATION SYSTEMS

(71) Applicant: Tesla, Inc., Palo Alto, CA (US)

(72) Inventor: Sandeep Narla, San Jose, CA (US)

(73) Assignee: Tesla, Inc., Palo Alto, CA (US)

(*) Notice: Subject to any disclaimer, the term of this patent is extended or adjusted under 35 U.S.C. 154(b) by 135 days.

(21) Appl. No.: 16/796,751

(22) Filed: Feb. 20, 2020

(65) Prior Publication Data
US 2020/0235592 A1 Jul. 23, 2020

Related U.S. Application Data

(63) Continuation of application No. 15/678,068, filed on Aug. 15, 2017, now Pat. No. 10,601,234.

(51) Int. Cl.
H02J 7/00 (2006.01)
H02J 9/06 (2006.01)
(Continued)

(52) U.S. Cl.
CPC .......... *H02J 7/0031* (2013.01); *H02H 1/0015* (2013.01); *H02H 7/10* (2013.01);
(Continued)

(58) Field of Classification Search
CPC .. H02J 3/38; H02J 3/383; H02J 7/0031; H02J 7/0068; H02J 7/35; H02J 9/061;
(Continued)

(56) References Cited

U.S. PATENT DOCUMENTS 8,179,147 B2 5/2012 Dargatz et al.
8,547,669 B2 10/2013 Larson et al.
(Continued)

FOREIGN PATENT DOCUMENTS

CN 205545149 U 8/2016
JP 2016-19390 A 2/2016

OTHER PUBLICATIONS

Ex Parte Quayle Action received for U.S. Appl. No. 15/678,068, dated Apr. 4, 2019, 8 pages.
(Continued)

*Primary Examiner* — Hal Kaplan
(74) *Attorney, Agent, or Firm* — Dentons US LLP

(57) ABSTRACT

A battery pack for an energy generation system includes a cell array of conductively interconnected power cells configured to store and discharge energy, a direct current (DC)-to-DC converter coupled to the cell array and configured to receive power from the cell array during discharging of the cell array or to output power to the cell array during charging of the cell array, a pair of output terminals coupled to the DC-to-DC converter for coupling with an external device; and an arc fault detection system coupled between the DC-to-DC converter and the pair of output terminals. The arc fault detection system includes a first sensor for measuring power transmitted between the DC-to-DC converter and the pair of output terminals and a controller coupled to the first sensor and configured to disable the battery pack based on a measurement of the power transmitted between the DC-to-DC converter and the output terminals.

20 Claims, 7 Drawing Sheets

(51) Int. Cl.
   *H02S 50/00* (2014.01)
   *H02J 7/35* (2006.01)
   *H02S 40/32* (2014.01)
   *H02S 40/38* (2014.01)
   *H02H 1/00* (2006.01)
   *H02J 3/38* (2006.01)
   *H02S 50/10* (2014.01)
   *H02H 7/18* (2006.01)
   *H02H 7/10* (2006.01)

(52) U.S. Cl.
   CPC ............ *H02H 7/18* (2013.01); *H02J 3/38* (2013.01); *H02J 3/383* (2013.01); *H02J 7/0068* (2013.01); *H02J 7/35* (2013.01); *H02J 9/061* (2013.01); *H02J 9/062* (2013.01); *H02S 40/32* (2014.12); *H02S 40/38* (2014.12); *H02S 50/00* (2013.01); *H02S 50/10* (2014.12)

(58) Field of Classification Search
   CPC .......... H02J 9/062; H02S 40/32; H02S 40/38; H02S 50/10; H02S 50/00; H02H 1/0015; H02H 7/10; H02H 7/18

USPC ................................................ 307/19, 150
   See application file for complete search history.

(56) References Cited

U.S. PATENT DOCUMENTS

| | | |
|---|---|---|
| 8,878,563 B2 | 11/2014 | Robbins |
| 9,008,978 B2 | 4/2015 | Robbins |
| 9,465,909 B2 | 10/2016 | Kawate et al. |
| 9,478,967 B2 | 10/2016 | Dargatz et al. |
| 10,199,843 B2 * | 2/2019 | Schimel ............... H02J 7/0071 |
| 2014/0373894 A1 | 12/2014 | Stratakos et al. |
| 2015/0244165 A1 | 8/2015 | Roesner et al. |
| 2016/0276820 A1 | 9/2016 | Olivas et al. |
| 2016/0352106 A1 | 12/2016 | Schimel |
| 2019/0058338 A1 | 2/2019 | Narla |

OTHER PUBLICATIONS

Notice of Allowance received for U.S. Appl. No. 15/678,068, dated Nov. 13, 2019, 10 pages.

* cited by examiner

ARC FAULT DETECTION FOR BATTERY PACKS IN ENERGY GENERATION SYSTEMS

CROSS-REFERENCE TO RELATED APPLICATIONS

This application is a continuation of U.S. patent application Ser. No. 15/678,068, entitled "ARC FAULT DETECTION FOR BATTERY PACKS IN ENERGY GENERATION SYSTEMS," filed Aug. 15, 2017, which the contents of the application are hereby incorporated by reference in their entireties.

BACKGROUND

In recent years, climate change concerns, reduction in costs, governmental initiatives, and other factors have driven a rapid rise in the adoption of distributed renewable energy generation systems (i.e., systems that generate energy using renewable resources such as solar, wind, fuel cells, geothermal, etc.) at residential and non-residential sites. Solar energy generation systems, in particular, have become very popular due to numerous advantages over other renewable and non-renewable energy sources.

Solar energy generation systems include photovoltaic (PV) modules that generate power from the sun, and can provide the generated power to a utility grid or to one or more onsite loads. Some PV energy generation systems can even store energy from the PV modules and/or utility grid in a battery for future use, such as when the PV modules are not generating power and/or when the AC grid is unavailable.

Such PV systems often comprise numerous components that interact with one another to provide usable power from the sun. These components can be damaged during manufacturing or transportation/distribution, or even be improperly installed, which can result in electrical discontinuities that can immediately cause, or build up over time, a thermal event such as arcing. Arcing is an electrical discharge of current through a normally non-conductive medium (e.g., air). The occurrence of such a thermal event can result in damage to one or more electrical components of the energy generation system if the thermal event is not addressed immediately. Because of the relatively high concentration of individual batteries, high resultant current, and potential for thermal runaway, it is particular important to guard against arc faults in onsite energy storage devices. Consequently, improvements to the mitigation of damage caused by thermal events are needed.

SUMMARY

Various embodiments of the disclosure provide an arc fault detection system that minimizes damage caused by thermal events in battery packs for energy generation systems by shutting off and/or disabling the battery pack in the event of a thermal event. The arc fault detection system can include one or more sensors and a controller. The controller can be configured to receive information from the sensors and immediately disable the battery pack when the received information indicates that a thermal event has occurred, thereby minimizing the chances of causing irreparable damage to the energy generation system.

In some embodiments a battery pack for an energy generation system includes a cell array of conductively interconnected power cells configured to store and discharge energy, a direct current (DC)-to-DC converter coupled to the cell array and configured to receive power from the cell array during discharging of the cell array or to output power to the cell array during charging of the cell array, a pair of output terminals coupled to the DC-to-DC converter for coupling with an external device, and an arc fault detection system coupled between the DC-to-DC converter and the pair of output terminals. The arc fault detection system includes: a first sensor for measuring power transmitted between the DC-to-DC converter and the pair of output terminals, and a controller coupled to the first sensor and configured to enable or disable the battery pack based on a measurement of the power transmitted between the DC-to-DC converter and the pair of output terminals.

The first sensor can measure voltage across power lines between the DC-to-DC converter and the pair of output terminals. The first sensor can measure an amount of current flow through a power line between the DC-to-DC converter and the pair of output terminals. The battery pack can further include a second sensor coupled between the cell array and the DC-to-DC converter. The second sensor can measure voltage across power lines between the cell array and the DC-to-DC converter. The second sensor can measure an amount of current flow through a power line between the cell array and the DC-to-DC converter. The battery pack can further include a cell battery management system (BMS) configured to control an operation of the cell array and a converter BMS configured to control an operation of the DC-to-DC converter. The cell BMS and the converter BMS can be coupled to and controlled by the controller. The battery pack can further include an AC-to-DC inverter coupled between the DC-to-DC converter and the pair of output terminals. The external device can be an inverter configured to receive DC power from a photovoltaic (PV) array.

In some embodiments, an energy generation system includes a photovoltaic (PV) array for generating direct current (DC) power, an inverter coupled to the PV array, wherein the inverter is configured to receive the generated DC power from the PV array and to convert the DC power to alternating current (AC) power, and a battery pack coupled to the inverter and configured to store and discharge energy. The battery pack can include a cell array of conductively interconnected power cells, a DC-to-DC converter coupled to the cell array to receive power from the cell array during discharging of the cell array or output power to the cell array during charging of the cell array, a pair of output terminals coupled to the DC-to-DC converter for coupling with an external device, and an arc fault detection system coupled between the DC-to-DC converter and the pair of output terminals. The arc fault detection system can include a first sensor for measuring power transmitted between the DC-to-DC converter and the pair of output terminals; and a controller coupled to the first sensor and configured to enable or disable the battery pack based on a measurement of the power transmitted between the DC-to-DC converter an the pair of output terminals.

The inverter can be configured to output to an AC grid and one or more back-up loads. The first sensor can measure voltage across positive and negative power lines between the DC-to-DC converter and the pair of output terminals. The first sensor can measure an amount of current flow through at least one power line of positive and negative power lines between the DC-to-DC converter and the pair of output terminals. The energy generation system can further include a second sensor coupled between the cell array and the DC-to-DC converter. The second sensor can measure voltage across positive and negative power lines between the cell array and the DC-to-DC converter. The second sensor can measure an amount of current flow through at least one power line of positive and negative power lines between the cell array and the DC-to-DC converter.

In some embodiments, a method of determining an arc fault in a battery pack for an energy generation system includes measuring, by a first sensor disposed between a cell array and a direct current (DC)-to-DC converter in the battery pack, power provided between the cell array and the DC-to-DC converter, measuring, by a second sensor disposed between the DC-to-DC converter and the a of output terminals for the battery pack, power provided between the DC-to-DC converter and the set of output terminals, determining, by a controller coupled to the first and second sets of sensors, that an electrical arcing has occurred based on the measurements from the first set of sensors and the second set of sensors; and performing, by the controller, at least one of: disabling, by a cell battery management system (BMS) coupled to and controlled by the controller, the cell array when arcing is detected by the first sensor and the second sensor during battery discharging, disabling, by a converter BMS coupled to and controlled by the controller, the DC-to-DC converter when arcing is detected by the second sensor but not detected by the first sensor during battery discharging, and disabling, by the converter BMS, the DC-to-DC converter when arcing is detected by the first sensor but not detected by the second sensor during battery charging.

The controller can be further configured to disable a DC-to-alternating current (AC) converter to which the DC-to-DC converter is coupled. The first sensor and the second sensor can each be at least one of a voltage sensor and a current sensor.

A better understanding of the nature and advantages of embodiments of the present invention may be gained with reference to the following detailed description and the accompanying drawings.

DETAILED DESCRIPTION

Battery packs for PV energy generation systems according to embodiments of the disclosure can include an arc fault detection system that can detect the occurrence of a thermal event and immediately shut down operation of the battery pack in response. In such energy generation systems, the arc fault detection system can include one or more sensors for measuring the voltage drop across positive and negative terminals and/or current flow across the positive and negative terminals of a battery pack. For instance, the sensors can be positioned to measure the voltage and/or current flow from an array of battery cells in the battery pack. In additional instances, the sensors can be positioned to measure voltage and/or current flow from a DC-to-DC converter of the battery pack. A controller can be coupled to the sensors to determine whether a thermal event has occurred, and immediately disable the battery cells and/or battery pack when a thermal event is detected. By being able to detect and immediately disable a battery pack when a thermal event is detected, various other components within the battery pack and the PV energy generation system can be substantially prevented from irreparable damage caused by the occurrence of the thermal event.

I. PV Systems

A PV energy generation system typically includes an array of PV modules connected together in one or more strings that generate DC power from the sun, one or more PV string inverters for converting the DC power from the strings to AC power, and a physical interface feeding into the utility grid—typically on the load side of the utility meter, between the meter and the customer's main electrical panel. The conventional solar energy generation system provides excess AC power/energy back to the utility grid, resulting in cost benefits to the customer or resulting in a source of grid services. The PV energy generation system can also route power from the utility grid to one or more loads at the customer site. There can be two types of PV energy generation systems: an AC-coupled energy generation system and a DC-coupled energy generation system.

A. AC-Coupled PV Systems

Figure 1:
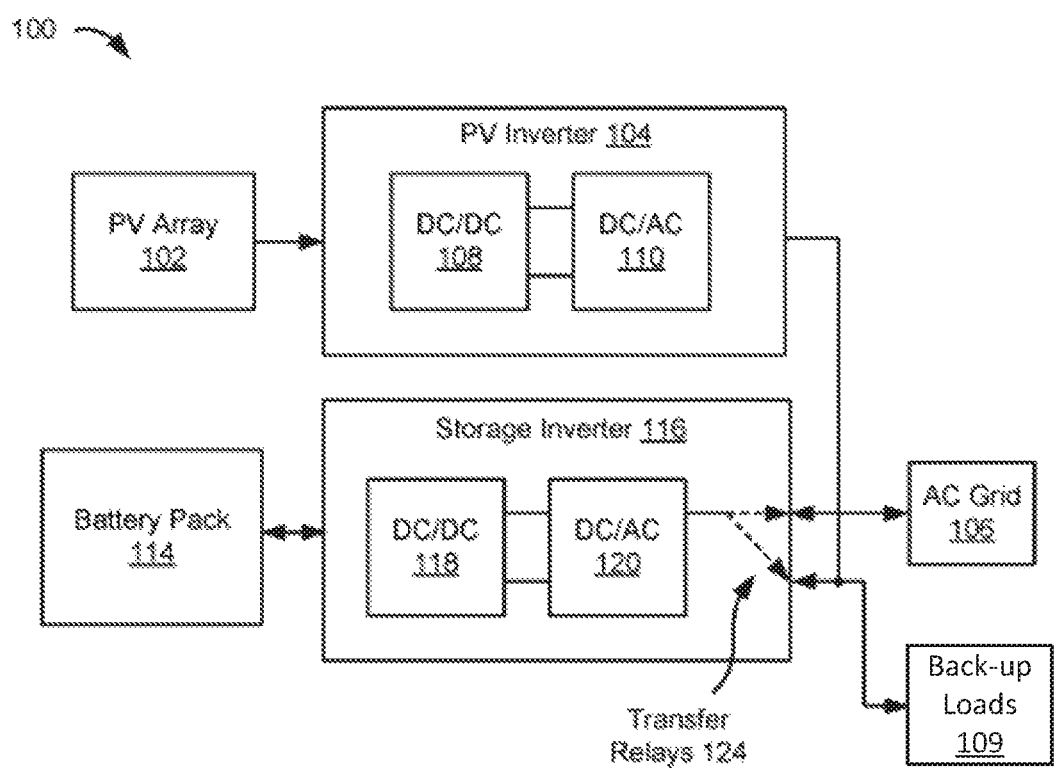
FIG. 1 is a simplified diagram illustrating an AC-coupled energy generation system.

FIG. 1 illustrates a block diagram of an AC-coupled energy generation system 100. The energy generation system is called an AC-coupled energy generation system because a PV inverter and a storage inverter are coupled at the AC side of each inverter. As shown, AC-coupled energy generation system 100 is a PV system that includes PV array(s)/strings 102 for generating DC power and grid-tied PV string inverter 104 for converting the generated DC power to AC power for feeding into AC grid 106 at the interface for back-up loads 109. PV array 102 may be a single PV module or an array(s)/string(s) of PV modules capable of generating DC voltage from photons emitted from a light source such as the sun. Inverter 104 may include DC-to-DC converter 108 for stepping up or down the received DC power from PV array 102 to a suitable level for inversion, and DC-to-AC inverter 110 for inverting the DC power to AC power for outputting to AC grid 106. In some embodiments, the DC-to-DC conversion and maximum power point tracking (MPPT) may take place on the roof in the form of PV optimizers. In certain embodiments where strings of PV modules are long enough to provide high voltage sufficient for conversion on their own, only a DC-to-AC inverter may be implemented in PV system 100. The micro-inverter may include a DC-to-DC converter and a DC-to-AC inverter, and may be installed on the roof instead of PV inverter 104.

PV system 100 may also include battery pack 114 for storing energy and charging/discharging power. Battery pack 114 may be any lead-acid or advanced lead-acid, lithium-ion battery, flow battery, organic battery pack or the like. Power discharged from battery pack 114 may be provided to storage inverter 116, which may include DC-to-DC converter 118 for stepping up or down the DC voltage provided by battery pack 114 to a suitable level for inversion. DC-to-DC converter 118 may be a buck-boost converter that is implemented when battery pack 114 does not include a separate DC-to-DC buck-boost converter. In some embodiments, DC-to-DC converter 118 may still be required in storage inverter 116 if the DC-to-DC buck-boost converter inside battery pack 114 is not sufficient to match the conversion voltage of storage inverter 116. Storage inverter 116 may also include DC-to-AC inverter 120 for converting the DC power from battery pack 114 to AC power for outputting to AC grid 106 or one or more back-up loads 109. Anti-islanding relays (not shown) may be implemented within the PV inverter and the storage inverter to direct power between inverters 104 and 116 and AC grid 106. Transfer relays 124 may be implemented within storage inverter 116 to direct power between inverter 116 and either AC grid 106 or back-up loads 109. In various embodiments, when transfer relays 124 are in a first position, storage inverter 116 may provide power to or receive power from AC grid 106, and when transfer relays are in a second position, storage inverter 116 may provide power to back-up loads 109. In the second position, the PV inverter may provide AC power to the storage inverter to charge the battery.

B. DC-Coupled PV Systems

Figure 2:
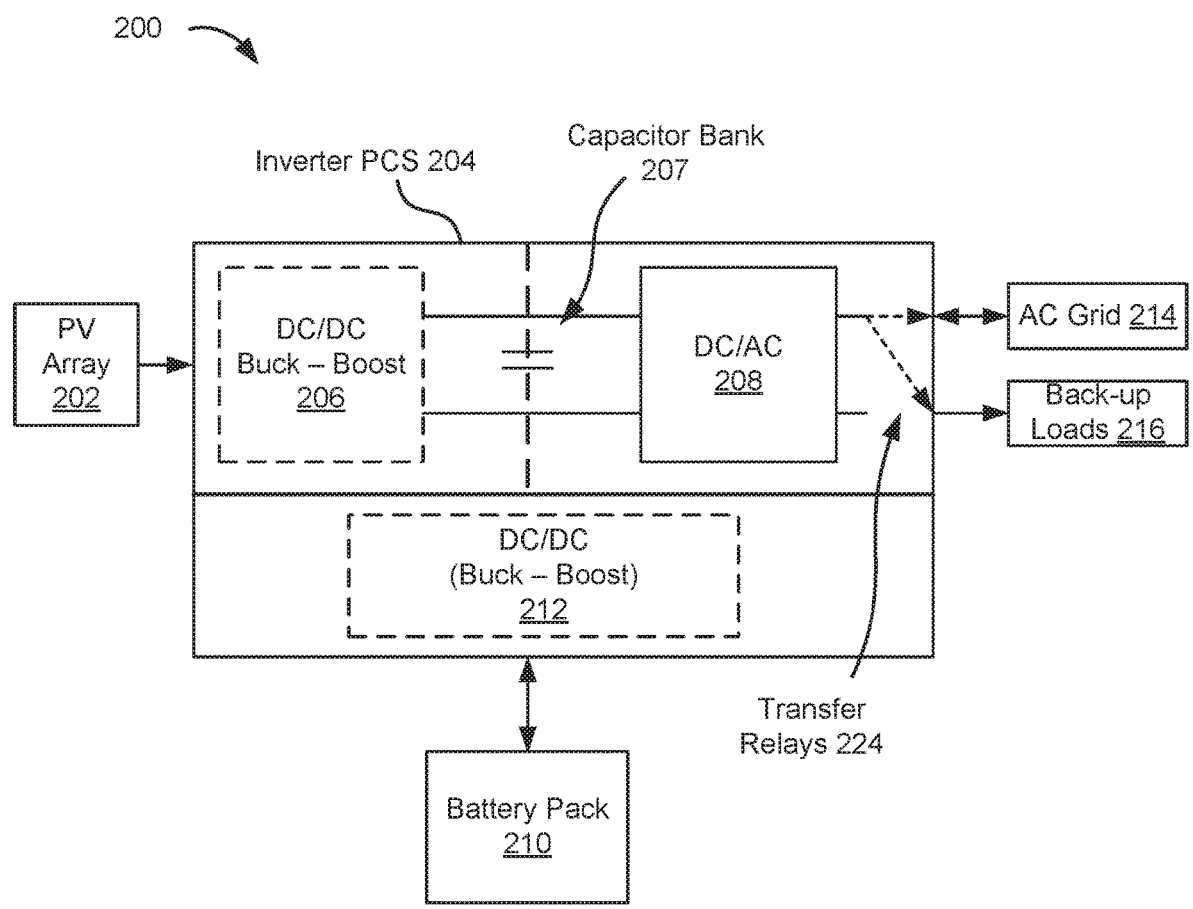
FIG. 2 is a simplified diagram illustrating a DC-coupled energy generation system.

Another type of PV system is a DC-coupled energy generation system as shown in FIG. 2, which illustrates a block diagram of exemplary DC-coupled energy generation system 200. This system is DC-coupled because a battery pack and a PV array are coupled to the DC side of an inverter. DC-coupled energy generation system 200 is a PV system that includes PV array(s)/string(s) 202 for generating DC power and inverter power control system (PCS) 204 for converting the generated DC power to AC power for outputting to AC grid 214 or back-up loads 216. Instead of having two separate inverters, as shown in FIG. 1, system 200 may only have a single inverter PCS that is configured to control the flow of power between DC sources, e.g., PV array 202 and battery pack 210, and AC output destinations, e.g., AC grid 214 and back-up loads 216. Similar to transfer relays 124 in FIG. 1, transfer relays 224 may determine which output destination will receive power from inverter PCS 204. In various embodiments, when transfer relays 224 are in a first position, inverter PCS 204 may provide power to or receive power from AC grid 214, and when transfer relays 224 are in a second position, inverter PCS 204 may provide power to back-up loads 216. Anti-islanding relays (not shown) may be implemented within PV inverter PCS 204 to direct power from AC grid 214.

Inverter PCS 204 may include DC-to-DC converter 206 for ensuring that the voltage provided to DC-to-AC inverter 208 is sufficiently high for inversion. In some embodiments, the DC-to-DC conversion may take place on the roof in the form of PV optimizers. In certain embodiments where strings of PV modules are long enough to provide high voltage sufficient for conversion on their own, only a DC-to-AC inverter may be implemented in PV system 200. Inverter PCS 204 also includes a DC link bus attached to battery pack 210 so that the DC power coming from PV array 202 can be used to deliver DC power to battery pack 210. The DC link bus is represented by capacitor bank 207 shown between the two DC-to-DC converters 206 and 212 and DC-to-AC inverter 208 in FIG. 2.

Battery pack 210 can have a minimum and maximum associated operating voltage window, such as for example, 12 volts to 1000 volts. Because battery pack 210 has a maximum exposed input voltage limit (e.g., 1000 volts) that, in many cases, is lower than the theoretical maximum DC voltage coming off of the strings (e.g., 600-1000 volts at open circuit), buck-boost circuit 206 or 212 may be implemented between the string-level PV input of inverter PCS 204 and the DC-link connection to battery pack 210. The inclusion of buck-boost circuit 206 or circuit 212 will prevent battery pack 210 from being exposed to voltages above a safe threshold, thereby eliminating the possibility of damage to battery pack 210 from overvoltage stress. For instance, when DC-to-DC converter 206 is only a boost converter, then DC-to-DC converter 212 may be a buck-boost converter for preventing battery pack 210 from overvoltage stress. However, if DC-to-DC converter 206 is a buck and boost converter, then DC-to-DC converter 212 may not be needed. Further details of energy generation system 200 can be referenced in U.S. patent application Ser. No. 14/798,069, filed on Jul. 13, 2015, entitled "Hybrid Inverter Power Control System for PV String, Battery, Grid and Back-up Loads," which is herein incorporated by reference in its entirety for all purposes Back-up loads, e.g., back-up loads 109 and 216 in FIGS. 1 and 2, respectively, discussed herein above may be an entire set, or a subset of the entire set, of loads for a customer site. For instance, back-up loads may be certain loads that are considered to be more important than other loads during power outage. As an example, for a residential customer site, back-up loads may be a refrigerator, air conditioning unit, heater unit, and other loads important for human survival, whereas loads that are not considered back-up loads—but are still part of the entire set of loads-include a television set, a desk lamp, a nightstand light, and the like. For a commercial customer site, back-up loads may be a server bay, information technology infrastructure devices, and other loads important for business sustainability during a power outage, whereas loads that are not considered back-up loads 109 and 216 may be hallway lights, bathroom lights, desk lamps, and the like. In some embodiments, back-up loads may be included in a main panel (not shown) that houses connections for the entire set of loads for a customer site. In other embodiments, back-up loads may be included in a separate panel (not shown) beside the main panel.

C. Battery Packs

Figure 3:
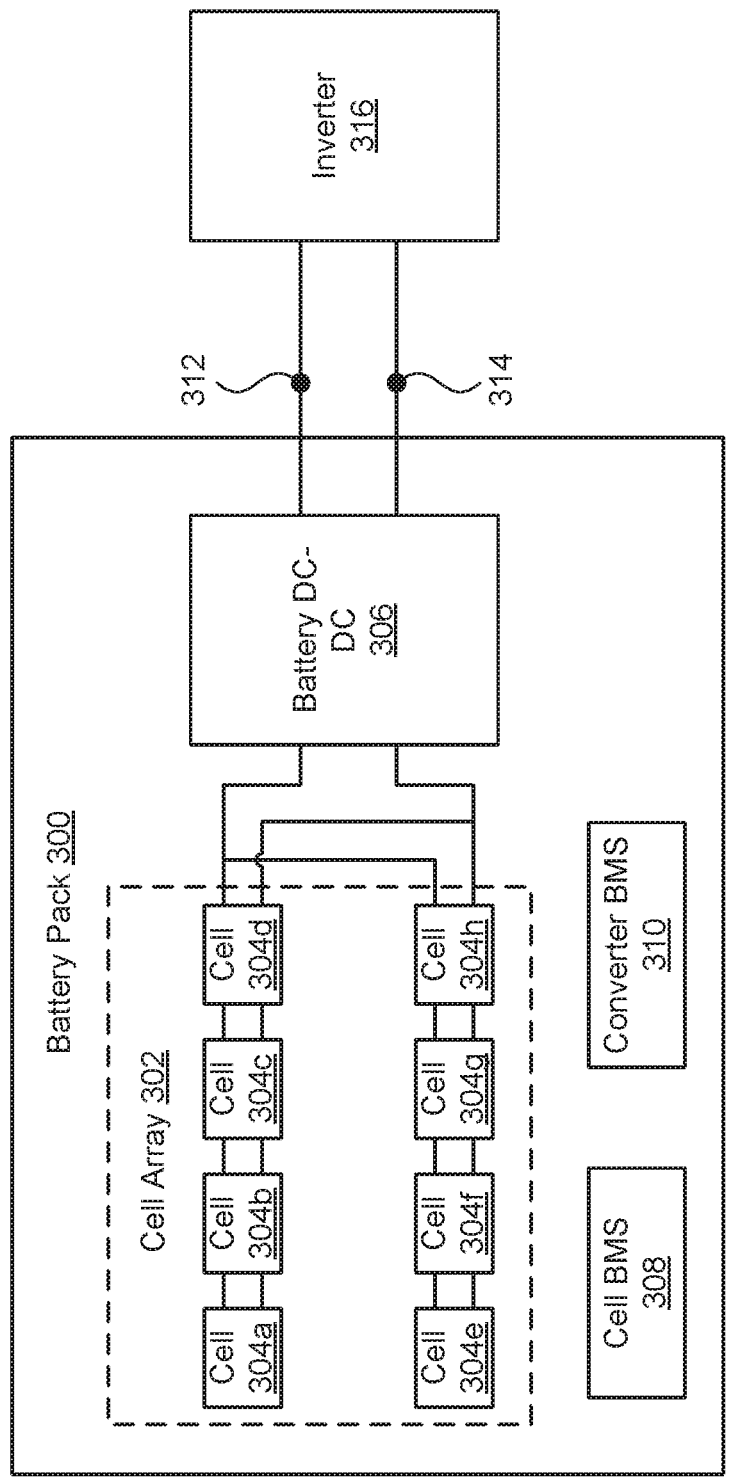
FIG. 3 is a simplified diagram illustrating an exemplary battery pack that is configured to store and discharge energy in an energy generation system.

Battery packs in solar energy generation systems are configured to store energy provided by PV modules and/or the AC grid and discharge the stored energy at a later time when power from PV modules and/or the AC grid are unavailable. FIG. 3 is a simplified diagram illustrating an exemplary battery pack 300 that is configured to store and discharge energy in an energy generation system. Battery pack 300 can include cell array 302 and DC-to-DC converter 306.

Cell array 302 can be formed of a plurality of individual battery cells 304*a-h* that can be arranged in various configurations. For instance, battery cells 304*a-h* can be arranged in series and parallel configurations as shown in FIG. 3. Specifically, cells 304*a-d* can be arranged in series and cells 304*e-h* can be arranged in series. The two series arrangements can be coupled together in parallel. Although FIG. 3 illustrates a series and parallel arrangement for only eight cells, it is to be appreciated that the cells do not have to arranged in series and parallel arrangements and can be made up of more or less than eight cells. The configuration of battery cells 304a-h in FIG. 3 is merely exemplary for discussion purposes.

Battery DC-to-DC converter 306 can be coupled to cell array 302 to manage the voltage inputted to cell array 302 from an external device (e.g., inverter 316, which can be any inverters discussed herein such as storage inverter 116 in FIG. 1 and inverter PCS 204 in FIG. 2) and outputted by cell array 302 the external device. Thus, battery DC-to-DC converter 306 can be a buck-boost converter that can step down voltage inputted into cell array 302 and step up voltage outputted by cell array 302. When battery pack 300 includes battery DC-to-DC converter 306, inverter 316 may not need a separate DC-to-DC converter, i.e., DC-to-DC converter 118 in storage inverter 116 in FIG. 1 and DC-to-DC converter 212 in inverter PCS 204 in FIG. 2. In some instances where battery DC-to-DC converter 306 alone is insufficient to buck an input voltage to cell array 302 to a suitable level for storage and/or boost an output voltage of cell array 302 to a suitable level for inversion, battery pack 300 may need to be coupled to another inverter, such as DC-to-DC converter 118 in storage inverter 116 in FIG. 1 and DC-to-DC converter 212 in inverter PCS 204 in FIG. 2.

Battery pack 300 can also include one or more battery management systems (BMSs) for controlling the operation of electrical components within battery pack 300. For instance, battery pack 300 can include a cell BMS 308 that is configured to control the operation of cell array 302. Cell BMS 308 can enable or disable the operation of cell array 302 as a whole, or in part. As an example, cell BMS 308 can enable the operation of cells 304a-d and disable the operation of cells 304e-h, or vice versa. Additionally or alternatively, cell BMS 308 can enable the operation of cells 304a-h or disable the operation of cells 304a-h. In addition to cell BMS 308, battery pack 300 can also include converter BMS 310 that can be configured to manage the operation of voltage converters within battery pack 300, such as battery DC-to-DC converter 306. For instance, converter BMS 310 can enable/disable the operation of battery DC-to-DC converter 306 for outputting power to an inverter, e.g., inverter 316, or enable/disable the operation of battery DC-to-DC converter 306 for receiving input power from inverter 316. Battery pack 300 can also include a set of positive and negative output terminals 312 through which power can be outputted from and inputted to battery pack 300.

As can be appreciated from the simplified drawing in FIG. 3, there are numerous electrical connections and electrical components within battery pack 300. The successful operation of battery pack 300 is highly dependent upon the absence of electrical discontinuities and arcing among those electrical connections and components. Any presence of electrical discontinuities, such as frayed wires, segmented conductive traces, loose connectors, and the like can cause a thermal event, e.g., arcing, which can cause battery pack 300 to fail or catch fire during operation of the PV system. These electrical discontinuities can be caused by mishandling of battery pack 300 during transportation from the manufacturer, or during installation of battery pack 300 at the installation site.

II. Arc Fault Detection for AC Battery Packs

According to embodiments of the present invention, battery packs for solar energy generation systems can be implemented with arc fault detection systems to detect a presence of arcing and shut down the operation of battery packs before the arcing can cause irreparable harm to electrical components (e.g., when an electrical component catches fire) within the battery pack and/or within the energy generation system. Arc fault detection systems can be formed of one or more electrical components that are configured to sense voltage and/or current through conductive lines and determine whether an arcing has occurred. When an arcing event is detected, the arc fault detection system can immediately shut down the operation of the battery pack by disabling a cell array and/or a voltage converter of the battery pack, as will be discussed in further detail herein.

A. Arc Fault Detection Between Battery Cells and Battery Converter

Figure 4:
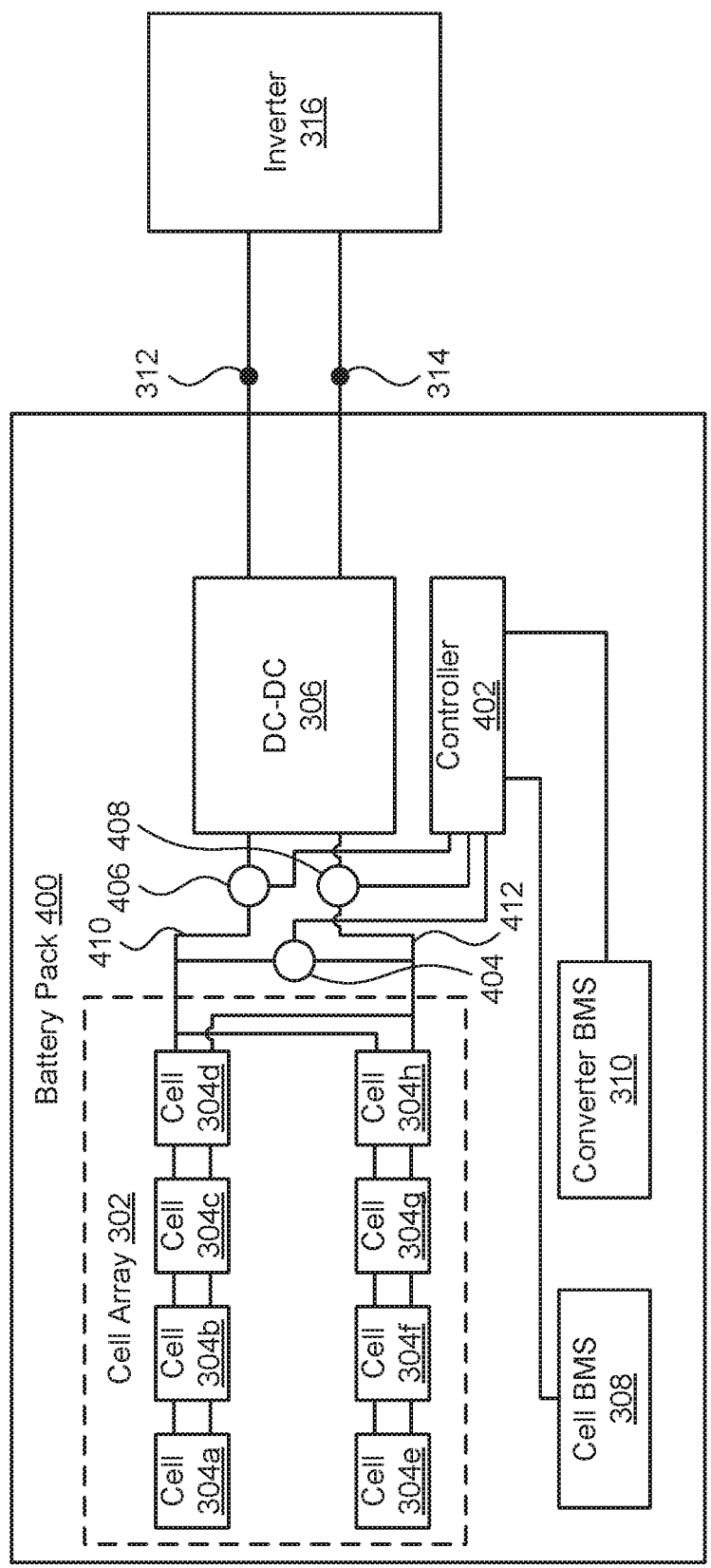
FIG. 4 is a simplified diagram illustrating an exemplary battery pack with an arc fault detection system coupled between battery cells and a battery converter for detecting an arcing event, according to some embodiments of the present disclosure.

FIG. 4 is a simplified diagram illustrating an exemplary battery pack 400 with an arc fault detection system coupled between battery cells and a battery converter for detecting an arcing event, according to some embodiments of the present disclosure. Similar to battery pack 300 in FIG. 3, battery pack 400 can include cell array 302, DC-to-DC converter 306, cell BMS 308, and converter BMS 310. Battery pack 400 can be coupled to inverter 316 through a set of output terminals 312 and 314 for receiving and outputting power. The numbering of these components in battery pack 400 of FIG. 4 matches corresponding components in battery pack 300 in FIG. 3 to indicate that the structure, configuration, and operation of these components are substantially similar. Thus, details of these components in FIG. 4, as well as other figures having the same components herein, can be referenced from the disclosure with respect to the figure in which they were first introduced and that reiteration of the functions and operation of these components is not repeated for clarity and brevity.

The arc fault detection system of battery pack 400 can include a controller 402 and one or more sensors 404, 406, and 408. Controller 402 can be any suitable electronic device that includes memory and a processor configured to execute commands according to instructions in the memory to manage the operation of BMSs 308 and 310 based on information from sensors 404, 406, and 408. For instance, controller 402 can be a microcontroller, field programmable gate array (FPGA), and the like. Controller 402 can be configured to receive measurements from sensors 404, 406, and 408 regarding voltage levels and amounts of current flow between cell array 302 and DC-to-DC converter 306.

Sensor 404 can be a voltage sensor coupled across a positive power line 410 and a negative power line 412 between cell array 302 and DC-to-DC converter 306. During battery discharging, energy stored in cell array 302 can be first outputted to DC-to-DC converter 306 and then discharged to positive and negative terminals 312 and 314 to be outputted to inverter 316. Accordingly, sensor 404 can measure the voltage across positive and negative power lines 410 and 412 from cell array 302 to determine whether an electrical discontinuity or an arcing has occurred across cell array 302 during battery discharging. If an electrical discontinuity or an arcing occurs within cell array 302, then sensor 404 can measure abnormalities in the voltage level caused by the arcing. Controller 402 can receive these measurements from sensor 404 and control cell BMS 308 to disable cell array 302. By disabling cell array 302 upon the detection of an electrical discontinuity or arcing, the arc fault detection system can prevent further damage to battery pack 400 or other components within the energy generation system. In some embodiments, controller 402 can also be coupled to converter BMS 310, and can be configured to disable DC-to-DC converter 306 upon the detection of an electrical discontinuity or arcing event as well. Thus, DC-to-DC converter 306 may not continue to operate when cell array 302 is disabled.

In addition to sensor 404 for measuring the voltage across positive and negative power lines 410 and 412 from cell array 302 during battery discharging, sensors 406 and 408 can be implemented along respective positive and negative power lines 410 and 412 to measure the amount of current flowing through them. For instance, sensor 406 can be a current sensor for measuring the amount of current flowing through positive power line 410 from cell array 302. Likewise, sensor 408 can be a current sensor for measuring the amount of current flowing through negative power line 412 from cell array 302. If an electrical discontinuity or an arcing occurs in cell array 302 and/or either of positive or negative power lines 410/412, then sensors 406 and/or 408 can measure abnormalities in the current flow caused by the arcing during battery discharge. Controller 402 can receive these measurements from sensors 406 and/or 408 and control cell BMS 308 to disable cell array 302 to prevent further damage to battery pack 400 or other components within the energy generation system.

As discussed herein, a battery pack can discharge energy during periods of discharge; however, a battery pack can also receive energy during battery charging. During charging, energy can first flow into DC-to-DC converter 306 from an external source, such as inverter 316, and then be outputted by DC-to-DC converter 306 and inputted to cell array 302 for storing. Thus, according to some embodiments, the arc fault detection system of FIG. 4 can also determine whether an electrical discontinuity or an arcing has occurred across DC-to-DC converter 306 during battery charging. That is, sensors 404, 406, and/or 408 can measure the voltage and/or current across the positive and negative power lines as power is being outputted by DC-to-DC converter 306 to cell array 302 to determine whether an electrical discontinuity or an arcing has occurred within DC-to-DC converter 306 during battery charging. If an electrical discontinuity or an arcing occurs within DC-to-DC converter 306, then sensors 404, 406, and 408 can measure abnormalities in the voltage level and/or current flow caused by the arcing. For instance, presence of an electrical discontinuity can cause a voltage drop across positive and negative power lines 410 and 412, which can be measured by voltage sensor 404. The presence of the electrical discontinuity can also cause AC noise to exist in the DC current, which can be measured by current sensors 406 and/or 408. An abnormal current reading can occur when the AC noise exceeds a threshold noise level of over 20 dB for an AC frequency of approximately 30-150 kHz, such as approximately 70 dB in some embodiments. Controller 402 can receive these abnormal measurements from sensors 404, 406, and/or 408 and control converter BMS 308 to disable DC-to-DC converter 306. By disabling DC-to-DC converter 306 upon the detection of an electrical discontinuity or arcing, the arc fault detection system can prevent further damage to cell array 302 or other components within the energy generation system. In some embodiments, controller 402 can also be coupled to cell BMS 308, and can be configured to disable cell array 302 upon the detection of an electrical discontinuity or arcing event as well. Thus, cell array 302 may not operate when DC-to-DC converter 306 is disabled.

B. Arc Fault Detection Between Battery Converter and Battery Terminals

As discussed herein with respect to FIG. 4, sensors of an arc fault detection system can be implemented in a battery pack to measure voltage and current flow between a cell array and a DC-to-DC converter of the battery pack. However, embodiments are not limited to such configurations. For instance, sensors of an arc fault detection system can be implemented in a battery pack to measure voltage and current flow between a DC-to-DC converter and a set of output terminals of the battery pack to detect an arcing event, as will be discussed herein with respect to FIG. 5.

Figure 5:
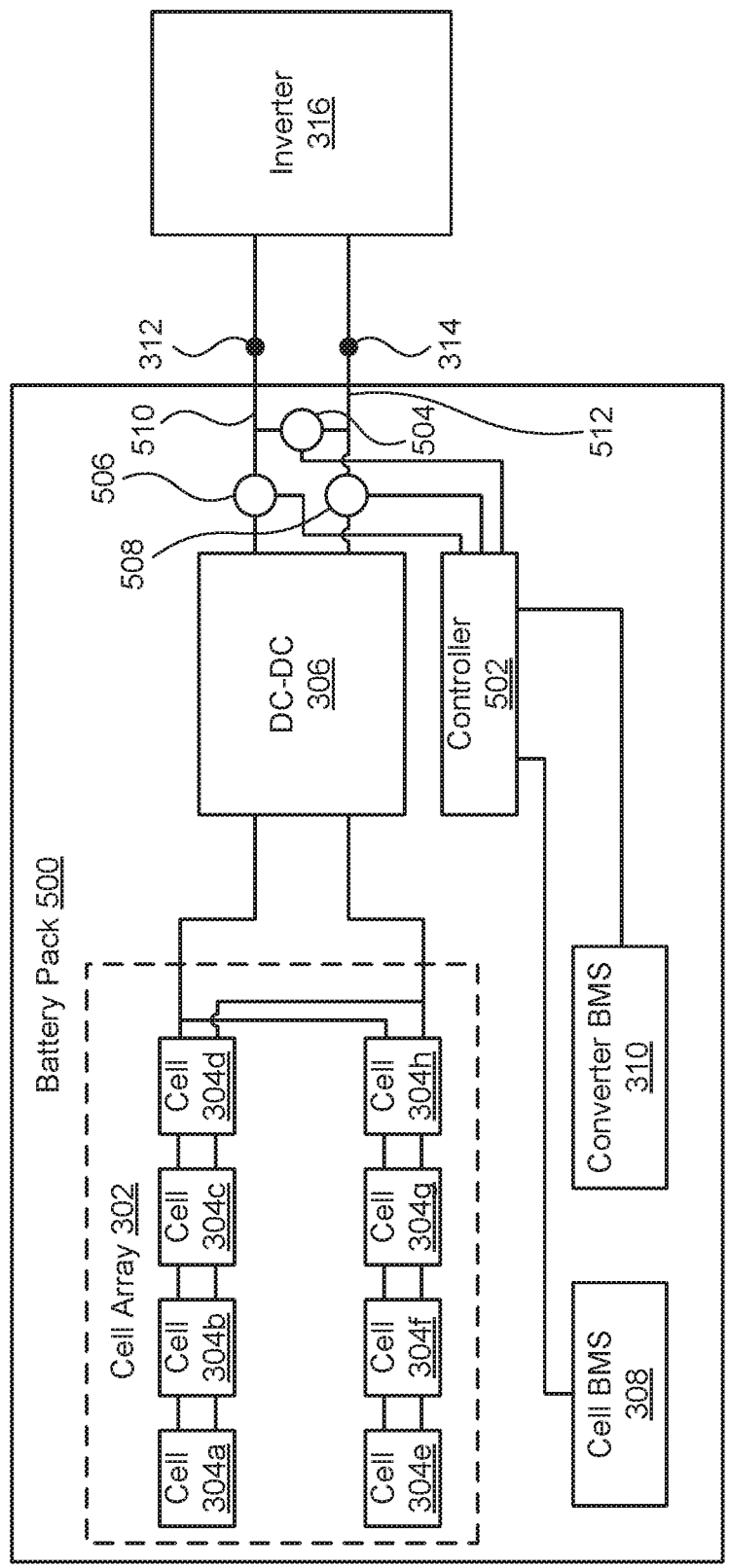
FIG. 5 is a simplified diagram illustrating an exemplary battery pack with an arc fault detection system coupled between a battery converter and a set of output terminals for detecting an arcing event, according to some embodiments of the present disclosure.

FIG. 5 is a simplified diagram illustrating an exemplary battery pack 500 with an arc fault detection system coupled between battery converter 306 and terminals 312 and 314 for detecting an arcing event, according to some embodiments of the present disclosure. The arc fault detection system of battery pack 500 can include a controller 502 and one or more sensors 504, 506, and 508. Similar to controller 402 in FIG. 4, controller 502 can be any suitable electronic device that includes memory and a processor configured to execute commands according to instructions in the memory to manage the operation of BMSs 308 and 310 based on information from sensors 504, 506, and 508. For instance, controller 502 can be a microcontroller, field programmable gate array (FPGA), and the like. Controller 502 can be configured to receive measurements from sensors 504, 506, and 508 regarding voltage levels and amounts of current flow between DC-to-DC converter 306 and terminals 312 and 316.

Sensor 504 can be a voltage sensor coupled across a positive power line 510 and a negative power line 512 between DC-to-DC converter 306 and an external device, such as inverter 316. Sensor 504 can measure the voltage across positive and negative power lines 510 and 512 to determine whether an electrical discontinuity or an arcing has occurred within DC-to-DC converter 306 during battery discharging. If an electrical discontinuity or an arcing occurs within DC-to-DC converter 306, then sensor 504 can measure abnormalities in the voltage level caused by the arcing. Controller 502 can receive these measurements from sensor 504 and control converter BMS 310 to disable DC-to-DC converter 306. By disabling DC-to-DC converter 306 upon the detection of an electrical discontinuity or arcing, the arc fault detection system can prevent further damage to battery pack 500 or other components within the energy generation system during battery discharging. In some embodiments, controller 502 can also be coupled to cell BMS 308, and can be configured to disable cell array 302 upon the detection of an electrical arcing in addition to disabling DC-to-DC converter 306. Thus, cell array 302 may not continue to operate while DC-to-DC converter 306 is disabled.

In addition to sensor 504 for measuring the voltage across positive and negative power lines 510 and 512 from DC-to-DC converter 306, sensors 506 and 508 can be implemented along respective positive and negative power lines 510 and 512 to measure the amount of current flowing through them during battery discharging. For instance, sensor 506 can be a current sensor for measuring the amount of current flowing through positive power line 510 from DC-to-DC converter 306 to inverter 316. Likewise, sensor 508 can be a current sensor for measuring the amount of current flowing through negative power line 512 from DC-to-DC converter 306 to inverter 316. If an electrical discontinuity or an arcing occurs in DC-to-DC converter 306 and/or either of the positive or negative power lines 510/512, then sensors 506 and/or 508 can measure abnormalities in the current flow caused by the arcing. Controller 502 can receive these abnormal measurements from sensors 506 and/or 508 and control converter BMS 310 to disable DC-to-DC converter 306 to prevent further damage to battery pack 500 or other components within the energy generation system.

During battery charging however, energy can first flow into DC-to-DC converter 306 from inverter 316, and then be outputted from DC-to-DC converter 306 into cell array 302 for storing. Thus, according to some embodiments, the arc fault detection system of FIG. 5 can also determine whether an electrical discontinuity or an arcing has occurred within inverter 316 or along electrical connections between inverter 316 and DC-to-DC converter 306 during battery charging. That is, sensors 504, 506, and/or 508 can measure the voltage and/or current of positive and negative power lines 510 and 512 as power is being inputted into DC-to-DC converter 306 by inverter 316 to determine whether an electrical discontinuity or an arcing has occurred within inverter 316 or the electrical connection between inverter 316 and DC-to-DC converter 306 during battery charging. If an electrical discontinuity or an arcing has occurred within inverter 316 and/or the electrical connection between inverter 316 and DC-to-DC converter 306, then sensors 504, 506, and 508 can measure abnormalities in the voltage level and/or current flow caused by the arcing. Controller 502 can receive these abnormal measurements from sensors 504, 506, and/or 508 and control both cell BMS 308 and converter BMS 310 to disable cell array 302 and DC-to-DC converter 306, respectively, to prevent further damage to cell array 302, DC-to-DC converter 306, and other components within the energy generation system.

C. Arc Fault Detection for Both Battery Cells and Converters

As mentioned herein, energy can first flow from a cell array to a DC-to-DC converter, and then from the DC-to-DC converter to a set of output terminals during discharging of the battery pack. Given that the energy outputted from the DC-to-DC converter is derived from energy outputted by the cell array, it may be difficult to determine whether an arcing has occurred in the cell array or in the DC-to-DC converter if the arc fault detection system only has sensors between the DC-to-DC converter and the set of output terminals as shown in FIG. 5. Similarly, when charging the battery pack, energy first flows from an inverter to the DC-to-DC converter, and then from the DC-to-DC converter to the cell array. The energy received by the cell array from the DC-to-DC converter is derived from energy outputted by the inverter. Thus, if the arc fault detection system only has sensors between the cell array and the DC-to-DC converter as shown in FIG. 4, it may be difficult to determine whether an arcing has occurred in the DC-to-DC converter or in the inverter. As such, arc fault detection systems according to some embodiments of the present disclosure include sensors between the cell array and the DC-to-DC converter, and between the DC-to-DC converter and the output terminals, as shown in FIG. 6.

Figure 6:
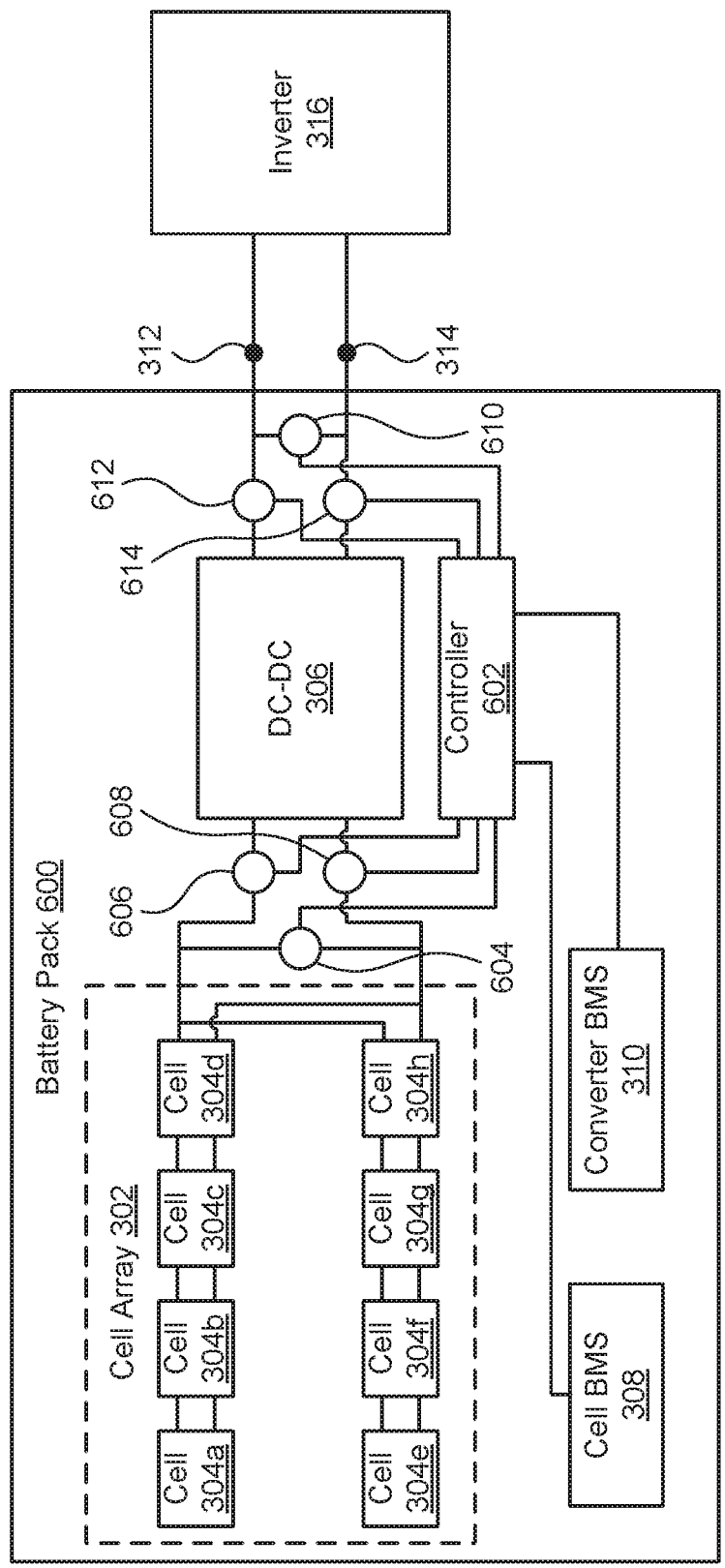
FIG. 6 is a simplified diagram illustrating an exemplary battery pack with an arc fault detection system coupled between battery cells, a DC-to-DC converter, and a set of output terminals for detecting an arcing event, according to some embodiments of the present disclosure.

FIG. 6 is a simplified diagram illustrating an exemplary battery pack 600 with an arc fault detection system coupled between battery cells, and a DC-to-DC converter, and between the DC-to-DC converter and output terminals 312 and 314 for detecting an arcing event, according to some embodiments of the present disclosure. As shown in FIG. 6, the arc fault detection system can include a controller 602 and two sets of sensors, where the first set of sensors includes sensors 604, 606, and 608, and the second set of sensors include sensors 610, 612, and 614. Sensor 604 can be a voltage sensor coupled between a positive and a negative power line between cell array 302 and DC-to-DC converter 306, and sensors 606 and 608 can be implemented along respective positive and negative power lines to measure the amount of current flowing through them. Similarly, sensor 610 can be a voltage sensor coupled between a positive and a negative power line between DC-to-DC converter 306 and an external device, such as inverter 316, and sensors 612 and 614 can be implemented along respective positive and negative power lines to measure the amount of current flowing through them. Sensors 604, 606, and 608 can have similar purpose and function to sensors 404, 406, and 408 in the arc fault detection system of FIG. 4; and sensors 610, 612, and 614 can have similar purpose and function to sensors 504, 506, and 508 in the arc fault detection system of FIG. 5. However, instead of only being able to detect arcing between cell array 302 and DC-to-DC converter 306 or between DC-to-DC converter 306 and an external device, the arc fault detection system in FIG. 6 can detect arcing both between cell array 302 and DC-to-DC converter 306 and between DC-to-DC converter 306 and an external device. Accordingly, the arc fault detection system of FIG. 6 can more accurately determine whether cell array 303, DC-to-DC converter 306, or the external device is failing internally than when only one set of sensors are implemented in the arc fault detection system. For instance, the arc fault detection system can utilize measurements from both sets of sensors and determine which component or electrical connection between the components is failing based on whether the first set of sensors are measuring an occurrence of arcing before the voltage is altered by the DC-to-DC converter, whether the second set of sensors are measuring an occurrence of arcing, or whether both the first and second sets of sensors are measuring an occurrence of arcing during charging or discharging of the battery pack.

As an example, controller 602 can determine that an arcing has occurred in cell array 302 or along the electrical connections between cell array 302 and DC-to-DC converter 306 when the measurements of both first set of sensors 604, 606, and 608 and second set of sensors 610, 612, and 614 indicate an arcing has occurred during discharging of the battery pack. For instance, a voltage drop or AC noise that exceeds a threshold noise level of over 20 dB for an AC frequency of approximately 30-150 kHz can indicate that an arcing has occurred in either set of sensors. Furthermore, controller 602 can determine that an arcing has occurred in DC-to-DC converter 306 or along the electrical connections between DC-to-DC converter 306 and an external device (e.g., inverter 316) when the measurements of second set of sensors 610, 612, 614 indicate an arcing has occurred but first set of sensors 604, 606, 608 do not indicate that an arcing has occurred during discharging of the battery pack.

Additionally, controller 602 can determine that an arcing has occurred in inverter 316 or along the electrical connections between inverter 316 and DC-to-DC converter 306 when the measurements of both first set of sensors 604, 606, and 608 and second set of sensors 610, 612, and 614 indicate an arcing has occurred during charging of the battery pack. Moreover, controller 602 can determine that an arcing has occurred in DC-to-DC converter 306 or along the electrical connections between DC-to-DC converter 306 and cell array 302 when the measurements of second set of sensors 610, 612, 614 do not indicate that an arcing has occurred but first set of sensors 604, 606, 608 indicate an arcing has occurred during charging of the battery pack. In some instance, measurements do not indicate that an arcing has occurred when a measured voltage does not indicate a voltage drop that exceeds the threshold voltage or when a measured current does not have AC noise that exceeds the threshold frequency. By being able to more accurately determine which component or electrical connection is failing, controller 602 can accurately respond to the arcing event by disabling the culprit component preventing unnecessary collateral damage. Additionally, time spent by a technician towards determining what component has failed can also be significantly minimized.

III. Arc Fault Detection for Ac Battery Packs

Disclosures herein with respect to FIGS. 3-6 relate to arc fault detection systems for battery packs that operate with DC power; however, embodiments are not limited to such configurations. Embodiments herein include arc fault detection systems for other types of battery packs, such as AC powered battery packs that operate with AC power as shown in FIG. 7.

Figure 7:
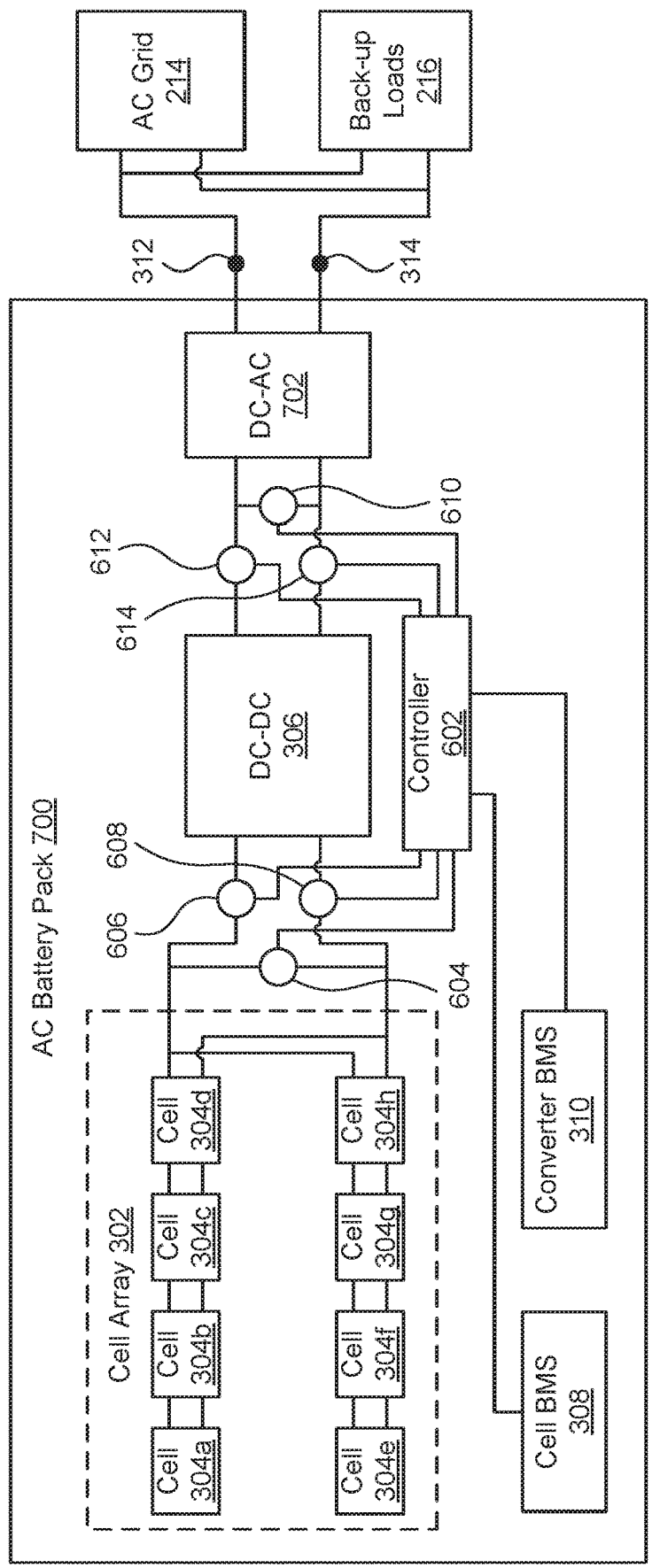
FIG. 7 is a simplified diagram illustrating an exemplary AC battery pack with an arc fault detection system, according to some embodiments of the present disclosure.

FIG. 7 is a simplified diagram illustrating an exemplary AC battery pack 700 with an arc fault detection system, according to some embodiments of the present disclosure. Similar to a DC battery pack, such as any of battery packs 300-600 in FIGS. 3-6, AC battery pack 700 can include a cell array 302 formed of battery cells 304a-h, DC-to-DC converter 306, cell BMS 308, and converter BMS 310. Unlike battery packs that operate with DC power, however, AC battery pack 700 can include a DC-to-AC inverter 702 coupled to DC-to-DC converter 306. DC-to-AC inverter 702 can be configured to receive DC power from DC-to-DC converter 306 and convert the DC power to AC power during battery discharging to power back-up loads 216 or push power back into AC grid 214. DC-to-AC inverter 702 can also be configured to receive AC power from AC grid 214 and convert the AC power to DC power during battery charging to store energy in cell array 302. Accordingly, an external inverter, such as storage inverter 116 in FIG. 1, may not be needed in the energy generation system.

In some embodiments, AC battery pack 700 can have an arc fault detection system that helps mitigate and/or prevent damage from occurring in the event of an electrical discontinuity or an electrical arcing. The arc fault detection system can be similar to any of the arc fault detections systems discussed herein with respect to FIGS. 3-6. For the embodiment shown in FIG. 7, the arc fault detection system can be similar to that discussed herein with respect to FIG. 6 where the arc fault detection system includes controller 602 and two sets of sensors: first set of sensors 604, 606, and 608 and second set of sensors 610, 612, and 614. Accordingly, the arc fault detection system in FIG. 7 can detect arcing both between cell array 302 and DC-to-DC converter 306 and between DC-to-DC converter 306 and DC-to-AC inverter 702. Accordingly, the arc fault detection system of FIG. 6 can accurately determine whether cell array 303, DC-to-DC converter 306, or DC-to-AC inverter 702 has experienced an arcing event. For instance, the arc fault detection system can utilize measurements from both sets of sensors and determine which component is failing based on whether the first set of sensors are measuring an occurrence of arcing, whether the second set of sensors are measuring an occurrence of arcing, or whether both the first and second sets of sensors are measuring an occurrence of arcing during charging or discharging of the battery pack.

As an example, controller 602 can determine that an arcing has occurred in cell array 302 or along the electrical connections between cell array 302 and DC-to-DC converter 306 when the measurements of both first set of sensors 604, 606, and 608 and second set of sensors 610, 612, and 614 indicate an arcing has occurred during discharging of the battery pack. As discussed herein, measurements can indicate that arcing has occurred when the measured voltage indicates a voltage drop that exceeds a threshold voltage and/or when the measured current indicates an AC noise level that exceeds the threshold frequency. Furthermore, controller 602 can determine that an arcing has occurred in DC-to-DC converter 306 or along the electrical connections between DC-to-DC converter 306 and DC-to-AC inverter 702 when the measurements of second set of sensors 610, 612, 614 indicate an arcing has occurred but first set of sensors 604, 606, 608 do not indicate that an arcing has occurred during discharging of the battery pack.

Additionally, controller 602 can determine that an arcing has occurred in DC-to-AC inverter 702 or along the electrical connections between DC-to-AC inverter 702 and DC-to-DC converter 306 when the measurements of both first set of sensors 604, 606, and 608 and second set of sensors 610, 612, and 614 indicate an arcing has occurred during charging of the battery pack. In this case, controller 602 can control converter BMS 310 to disable DC-to-AC inverter 702 to prevent significant damage from the arcing event. Moreover, controller 602 can determine that an arcing has occurred in DC-to-DC converter 306 or along the electrical connections between DC-to-DC converter 306 and cell array 302 when the measurements of second set of sensors 610, 612, 614 do not indicate that an arcing has occurred but first set of sensors 604, 606, 608 indicate an arcing has occurred during charging of the battery pack. By being able to more accurately determine which component or electrical connection is failing, controller 602 can more accurately determine which component to disable. Additionally, time spent by a technician towards determining what component has failed when repairing the energy generation system can also be significantly minimized.

Although the invention has been described with respect to specific embodiments, it will be appreciated that the invention is intended to cover all modifications and equivalents within the scope of the following claims.

What is claimed is:

1. A battery pack for an energy generation system, comprising:
    a cell array of battery cells configured to store and discharge energy;
    a direct current (DC)-to-DC converter coupled to the cell array and configured to receive power from the cell array during discharging of the cell array or to output power to the cell array during charging of the cell array;
    a pair of output terminals coupled to the DC-to-DC converter for coupling with an external device; and
    a fault detection system coupled to the DC-to-DC converter, the fault detection system comprising:
        a sensor configured to measure power transmitted between the cell array and the pair of output terminals; and
        a controller coupled to the sensor and configured to enable or disable the battery pack based on a measurement of the power transmitted between the cell array and the pair of output terminals.

2. The battery pack of claim 1, wherein the sensor is configured to measure voltage across power lines between the cell array and the DC-to-DC converter.

3. The battery pack of claim 1, wherein the sensor is configured to measure voltage across power lines between the DC-to-DC converter and the pair of output terminals.

4. The battery pack of claim 1, wherein the sensor is a first sensor and the battery pack further comprises a second sensor coupled between the DC-to-DC converter and the pair of output terminals.

5. The battery pack of claim 4, wherein the second sensor is configured to measure voltage across power lines between the DC-to-DC converter and the pair of output terminals.

6. The battery pack of claim 4, wherein the second sensor is configured to measure an amount of current flow through a power line between the DC-to-DC converter and the pair of output terminals.

7. The battery pack of claim 1, further comprising:
a cell battery management system (BMS) configured to control an operation of the cell array; and
a converter BMS configured to control an operation of the DC-to-DC converter.

8. The battery pack of claim 7, wherein the cell BMS and the converter BMS are coupled to and controlled by the controller.

9. The battery pack of claim 1, further comprising a DC-to-AC inverter coupled between the DC-to-DC converter and the pair of output terminals.

10. The battery pack of claim 1, wherein the external device is an inverter configured to receive DC power from a photovoltaic (PV) array.

11. An energy generation system, comprising:
a photovoltaic (PV) array for generating direct current (DC) power;
an inverter coupled to the PV array, wherein the inverter is configured to receive the generated DC power from the PV array and to convert the DC power to alternating current (AC) power; and
a battery pack coupled to the inverter and configured to store and discharge energy, the battery pack comprising:
a cell array of battery cells;
a DC-to-DC converter coupled to the cell array configured to receive power from the cell array during discharging of the cell array or output power to the cell array during charging of the cell array;
a pair of output terminals coupled to the DC-to-DC converter for coupling with an external device; and
a fault detection system coupled to the DC-to-DC converter, the fault detection system comprising:
a sensor configured to measure power transmitted between the cell array and the pair of output terminals; and
a controller coupled to the sensor and configured to enable or disable the battery pack based on a measurement of the power transmitted between the cell array and the pair of output terminals.

12. The energy generation system of claim 11, wherein the fault detection system is configured to detect arcing or electrical discontinuity within the cell array.

13. The energy generation system of claim 11, wherein the sensor measures voltage across positive and negative power lines between the cell array and the DC-to-DC converter.

14. The energy generation system of claim 11, wherein the sensor measures an amount of current flow through at least one power line of positive and negative power lines between the cell array and the DC-to-DC converter.

15. The energy generation system of claim 11, wherein the sensor is a first sensor and the energy generation system further comprises a second sensor coupled between the DC-to-DC converter and the pair of output terminals.

16. The energy generation system of claim 15, wherein the second sensor measures voltage across positive and negative power lines between the DC-to-DC converter and the pair of output terminals.

17. The energy generation system of claim 15, wherein the second sensor measures an amount of current flow through at least one power line of positive and negative power lines between the cell array and the DC-to-DC converter.

18. A method of determining a fault in a battery pack for an energy generation system, the method comprising:
measuring, by a sensor coupled to a DC-to-DC converter, power provided between a cell array and a pair of output terminals for the battery pack;
determining, by a controller coupled to the sensor, that an electrical arcing or electrical discontinuity has occurred based on the measurements from the sensor; and
disabling, by the controller, the battery pack in response to electrical arcing or discontinuity being detected by the sensor during battery pack discharging.

19. The method of claim 18, wherein the sensor is a first sensor and wherein disabling the battery pack in response to electrical arcing or discontinuity being detected by the first sensor during battery discharging comprises at least one of:
disabling, by a cell battery management system (BMS) coupled to and controlled by the controller, the cell array when arcing is detected by the first sensor and a second sensor during battery discharging,
disabling, by a converter BMS, the DC-to-DC converter when arcing is detected by the first sensor but not detected by the second sensor during battery charging.

20. The method of claim 18, wherein the first sensor is disposed between the cell array and the DC-to-DC converter and the second sensor is disposed between the DC-to-DC converter and the pair of output terminals.

\* \* \* \* \*